United States Patent [19]
Choe et al.

[11] Patent Number: 5,455,016
[45] Date of Patent: Oct. 3, 1995

[54] MEMBRANE-ASSISTED PROCESS TO PRODUCE AMMONIA

[75] Inventors: Jun S. Choe, Harleysville; Lyndon J. Kellogg, Jr., Slatington, both of Pa.

[73] Assignee: Air Products and Chemicals, Inc., Allentown, Pa.

[21] Appl. No.: 299,184

[22] Filed: Aug. 31, 1994

[51] Int. Cl.$^6$ ..................................................... C01C 1/04
[52] U.S. Cl. ................................................. 423/359; 95/47
[58] Field of Search ................................. 427/359; 95/47

[56] References Cited

U.S. PATENT DOCUMENTS

| | | | |
|---|---|---|---|
| 4,172,885 | 10/1979 | Perry | 423/359 |
| 4,180,552 | 12/1979 | Graham et al. | 423/359 |
| 4,180,553 | 12/1979 | Null et al. | 423/359 |
| 4,758,250 | 7/1988 | Laciak et al. | 55/16 |
| 4,793,829 | 12/1988 | Pan et al. | 55/16 |

*Primary Examiner*—Wayne Langel
*Attorney, Agent, or Firm*—Robert J. Wolff

[57] ABSTRACT

A membrane-assisted process to produce ammonia is set forth wherein the recycle stream from the ammonia process containing primarily unreacted hydrogen and nitrogen but also containing inerts and unrecovered ammonia is separated in a first ammonia-selective membrane separator into a permeate stream enriched in ammonia and a non-permeate stream enriched in hydrogen, nitrogen and the inerts which is recycled to the reactor feed. A key to the present invention is that the permeate stream enriched in ammonia is recycled to the reactor effluent.

In one embodiment of the present invention, the purge stream from the ammonia process (which represents that portion of the recycle stream which must removed from the process in order to prevent the build-up of the inerts in the process) is separated in a second ammonia-selective membrane separator into a permeate stream enriched in ammonia which is recycled to the reactor feed and a non-permeate stream enriched in hydrogen, nitrogen and the inerts which can be further processed for hydrogen recovery. A key to this embodiment is that a portion of the reactor feed is used to sweep the permeate side of the second membrane separator.

2 Claims, 1 Drawing Sheet

MEMBRANE-ASSISTED PROCESS TO PRODUCE AMMONIA

FIELD OF THE INVENTION

The present invention relates to a membrane-assisted process to produce ammonia wherein a first ammonia-selective membrane is utilized in the processing of the recycle stream from the process and, optionally, a second ammonia-selective membrane is utilized in the processing of the purge stream from the process.

BACKGROUND OF THE INVENTION

Ammonia is a fertilizer and chemical feed stock that is typically produced in large scale plants via the catalytic reaction of hydrogen and nitrogen at high temperatures and pressures. The reaction is equilibrium limited with a hydrogen conversion of approximately 25% per pass. The reactor effluent is typically 12–18% ammonia with the remainder consisting of unreacted hydrogen, unreacted nitrogen and inerts such as methane and argon. The ammonia product is recovered from the reactor effluent in a separation system which involves repeatedly cooling and flashing the reactor effluent to effect the condensation of the "heavier" ammonia from the remaining "lights". Such cooling requires large amounts of refrigeration which makes the overall process very energy intensive. Because the amount of refrigeration which would be required to recover all the ammonia from the reactor affluent is prohibitively large, the remaining lights typically still contain 2–6% ammonia.

In order to take advantage of the large amounts of unreacted hydrogen and nitrogen contained in the remaining lights, the majority of the remaining lights are recycled to the reactor as a recycle stream. To prevent the build-up of the inerts in the process, however, a portion of the remaining lights must be purged from the process as a purge stream.

The present invention is particularly concerned with the processing of the above noted recycle and purge streams with corresponding ammonia-selective membranes. The use of an ammonia-selective membrane to recover ammonia from the recycle stream in an ammonia plant is taught in the art. See for example U.S. Pat. No. 4,758,250 by Laciak et al. Similarly, the use of an ammonia-selective membrane to recover ammonia from the purge stream in an ammonia plant is also taught in the art. See for example U.S. Pat. No. 4,793,829 by Pan et al. The present invention, however, teaches a specific and novel integration of an ammonia-selective membrane into both the recycle loop and purge loop of an ammonia plant that will realize a number of process and operational benefits.

SUMMARY OF THE INVENTION

The present invention is a membrane-assisted process to produce ammonia wherein the recycle stream from the ammonia process containing primarily unreacted hydrogen and nitrogen but also containing inerts and unrecovered ammonia is separated in a first ammonia-selective membrane separator into a permeate stream enriched in ammonia and a non-permeate stream enriched in hydrogen, nitrogen and the inerts which is recycled to the reactor feed. A key to the present invention is that the permeate stream enriched in ammonia is recycled to the reactor effluent.

In one embodiment of the present invention, the purge stream from the ammonia process (which represents that portion of the recycle stream which must removed from the process in order to prevent the build-up of the inerts in the process) is separated in a second ammonia-selective membrane separator into a permeate stream enriched in ammonia which is recycled to the reactor feed and a non-permeate stream enriched in hydrogen, nitrogen and the inerts which can be further processed for hydrogen recovery. A key to this embodiment is that a portion of the reactor feed is used to sweep the permeate side of the second membrane separator.

DETAILED DESCRIPTION OF THE INVENTION

Figure 1:
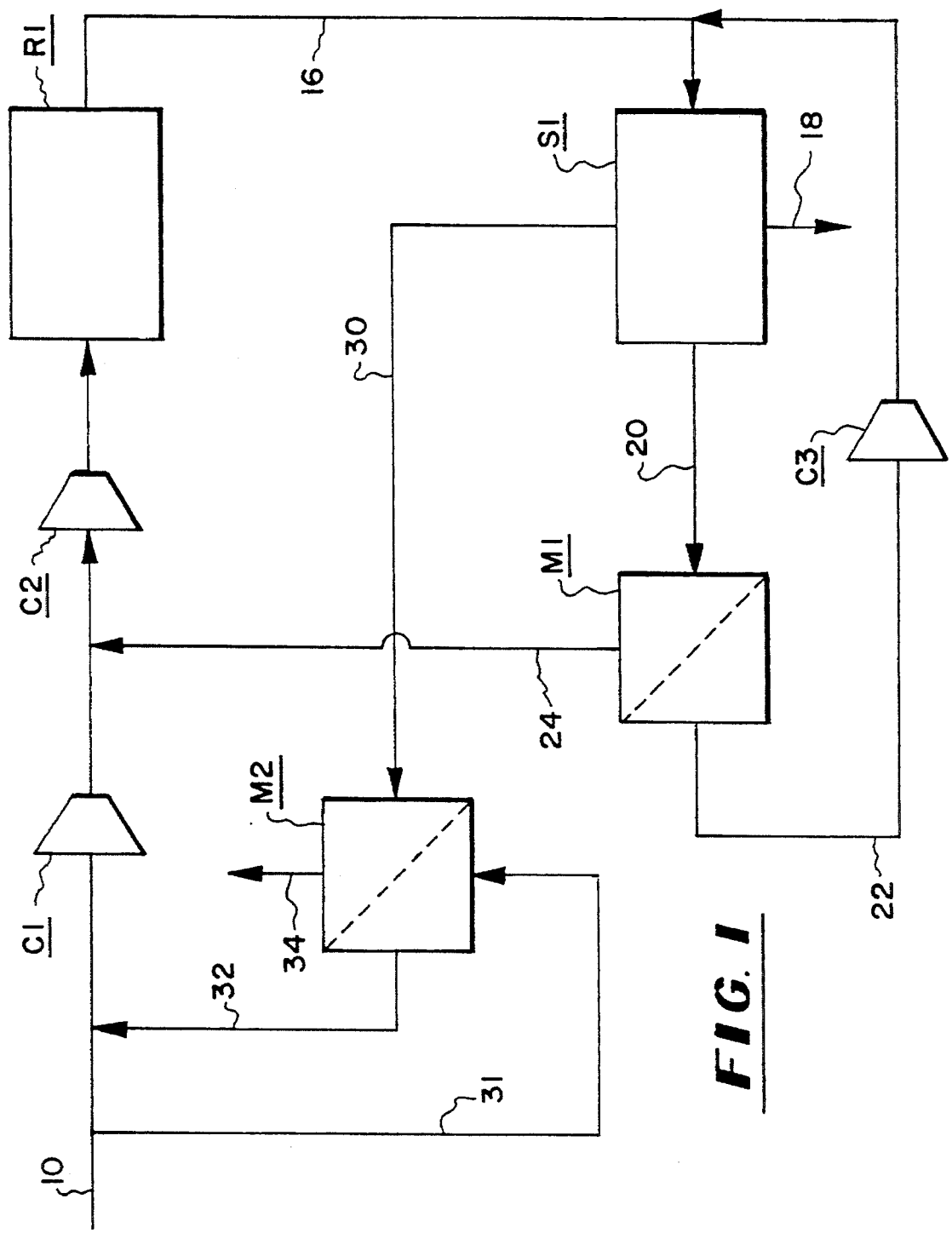
FIG. 1 is a schematic diagram of one embodiment of the present invention.

The process of the present invention is best illustrated with reference to a specific embodiment thereof such as FIG. 1's embodiment. Referring now to FIG. 1, feed stream 10 comprising hydrogen and nitrogen is compressed in compressors C1 and C2 and subsequently introduced into reactor R1. Reactor effluent 16 comprising ammonia, unreacted hydrogen, unreacted nitrogen and inerts comprising methane and argon is withdrawn from reactor R1 and subsequently introduced into separation system S1 wherein, via series of cooling and flashing steps, the reactor effluent is separated into: product stream 18 which is enriched in ammonia; gaseous recycle stream 20 which is enriched in hydrogen, nitrogen and the inerts; and gaseous purge stream 30 which is also enriched in hydrogen, nitrogen and the inerts. It should be noted that although the ammonia product is initially condensed from the reactor effluent as a liquid, a portion of the ammonia product is often recovered in the gaseous state due to a limitation in the refrigeration capacity of the separation system.

With regard to the composition of the recycle stream as compared to the composition of the purge stream, this will depend as follows. If the flash vapors from the repeated flashings in the separation system (which flash vapors together constitute the recycle and purge streams) are all mixed together, the composition of the recycle and purge streams will be identical. On the other hand, if the recycle stream is removed from the separation system as the flash vapors from said system's initial flashings while the purge stream is removed as the flash vapors from said system's remaining final flashing(s), the purge stream will be advantageously enriched in the less volatile inerts vis-a-vis the more volatile hydrogen and nitrogen as compared to the recycle stream.

Gaseous recycle stream 20 is introduced into membrane separator M1 which can be a single stage unit as shown in FIG. 1 or a multi-stage unit. At a minimum, membrane separator M1 comprises a high pressure side separated from a low pressure side by a semi-permeable membrane which is selective for the permeation of ammonia. Gaseous recycle stream 20 is more specifically introduced into the high pressure side of membrane separator M1. Non-permeate recycle stream 24 which is further enriched in hydrogen, nitrogen and the inerts is withdrawn from the high pressure side of membrane separator M1 and subsequently recycled to the feed stream to compressor C2. Because the ammonia concentration in the reactor effluent is fixed by virtue of the fact that the reaction is equilibrium based, such recycling with a lower ammonia concentration has the effect of increasing the productivity of the reactor in terms of ammonia conversion per pass.

Permeate recycle stream 22 enriched in ammonia is withdrawn from the low pressure side of membrane separator M1 as a crude ammonia product, compressed in compressor C3 and subsequently recycled to reactor effluent 16. This has the potential effect of raising the ammonia concentration of the reactor effluent which in turn increases the quantity of ammonia separated in the separation system and recovered as product. Alternatively, all or a portion of permeate recycle stream 22 can be recycled to an appropriate location in the separation system (for example as a portion of the refrigerant used in the separation system's refrigeration system) or recovered as a crude ammonia product.

A key benefit of membrane separator M1 is that the membrane system is very efficient for crude or bulk separation thus allowing an increase in the level of ammonia in the feed without much penalty in increasing the membrane area requirement or reducing ammonia recovery in the membrane system. Allowing the recycle stream to leave the separation system with a higher ammonia level than the typical 2-6% will reduce the refrigeration requirement or the overall energy requirement per ammonia recovered.

Gaseous purge stream 30 is introduced into membrane separator M2 which also comprises a high pressure side separated from a low pressure side by a semi-permeable membrane which is selective for the permeation of ammonia. Gaseous purge stream 30 is more specifically introduced into the high pressure side of membrane separator M2. A portion of feed stream 10 is introduced into the low pressure side of membrane separator M2 as a sweep stream in stream 31. A key benefit of using a portion of the feed stream to sweep the permeate side of the purge loop membrane is that, because there is no ammonia in the sweep stream, an increased ammonia partial pressure driving force exists which reduces the required membrane area as compared to not using such a sweep stream.

Non-permeate purge stream 34 which is further enriched in the inerts is withdrawn from the high pressure side of membrane separator M2. Since non-permeate stream 34 will also contain significant quantities of hydrogen, this stream can be advantageously processed for hydrogen recovery. For example, a hydrogen-selective membrane can be utilized to recover the hydrogen from this stream. Finally, permeate purge stream 32 is withdrawn from the low pressure side of membrane separator M2 and recycled to feed stream 10 prior to compressor C1.

It should be noted a number of modifications can be made to the process of present invention. For example, the purge and recycle loops of the present invention can still include the water wash/distillation systems that have been traditionally used for recovering ammonia from the recycle and/or purge streams.

The present invention has been described with reference to a specific embodiment thereof. This embodiment should not be seen as a limitation of the scope of the present invention; the scope of such being ascertained by the following claims.

We claim:

1. A membrane-assisted process to produce ammonia comprising:
   (a) introducing a feed stream comprising hydrogen and nitrogen into a reactor in order to synthesize ammonia;
   (b) withdrawing from the reactor a reactor effluent comprising ammonia, unreacted hydrogen, unreacted nitrogen and inerts comprising methane and argon;
   (c) introducing the reactor effluent into a separation system wherein the reactor effluent is separated into a plurality of streams comprising:
      (i) a product stream enriched in ammonia;
      (ii) a gaseous recycle stream enriched in hydrogen, nitrogen and the inerts; and
      (iii) a gaseous purge stream enriched in hydrogen, nitrogen and the inerts;
   (d) introducing at least a portion of the gaseous recycle stream into a first membrane separator comprising a high pressure side separated from a low pressure side by a semi-permeable membrane which is selective for the permeation of ammonia wherein:
      (i) the gaseous recycle stream is more specifically introduced into the high pressure side of the first membrane separator;
      (ii) a non-permeate recycle stream further enriched in hydrogen and nitrogen is withdrawn from the high pressure side of the first membrane separator and subsequently recycled to the feed stream in step (a); and
      (iii) a permeate recycle stream enriched in ammonia is withdrawn from the low pressure side of the first membrane separator as a crude ammonia product;
   (e) recycling at least a portion of the crude ammonia product to reactor effluent in step (b);
   (f) introducing at least a portion of the gaseous purge stream into a second membrane separator comprising a high pressure side separated from a low pressure side by a semi-permeable membrane which is selective for the permeation of ammonia wherein:
      (i) the gaseous purge stream is more specifically introduced into the high pressure side of the second membrane separator;
      (ii) a portion of the feed stream from step (a) is introduced into the low pressure side of the second membrane separator as a sweep stream;
      (iii) a non-permeate purge stream further enriched in the inerts is withdrawn from the high pressure side of the second membrane separator; and
      (iv) a permeate purge stream is withdrawn from the low pressure side of the second membrane separator and recycled to the reactor feed in step (a).

2. The process of claim 1 wherein the non-permeate purge stream withdrawn in step (f)(iii) is processed for hydrogen recovery.

* * * * *